US008639452B2

(12) United States Patent
Ohshima et al.

(10) Patent No.: US 8,639,452 B2
(45) Date of Patent: Jan. 28, 2014

(54) BURNED-GAS PASSAGE AMOUNT COMPUTING METHOD AND SYSTEM USED IN EXHAUST GAS RECIRCULATION SYSTEM

(75) Inventors: Kazuya Ohshima, Toyota (JP); Takahiro Anami, Toyota (JP); Kazuhiro Yamada, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 293 days.

(21) Appl. No.: 13/063,117

(22) PCT Filed: Aug. 4, 2009

(86) PCT No.: PCT/IB2009/006442
§ 371 (c)(1),
(2), (4) Date: Mar. 9, 2011

(87) PCT Pub. No.: WO2010/029396
PCT Pub. Date: Mar. 18, 2010

(65) Prior Publication Data
US 2011/0166795 A1 Jul. 7, 2011

(30) Foreign Application Priority Data
Sep. 9, 2008 (JP) ................... 2008-231386

(51) Int. Cl.
*G01N 31/12* (2006.01)
*F02M 25/07* (2006.01)
(52) U.S. Cl.
USPC ......................... 702/22; 123/568.11
(58) Field of Classification Search
USPC .............. 702/22, 23; 700/275, 274; 123/568.11–568.21, 205, 217, 672, 123/704
See application file for complete search history.

(56) References Cited

U.S. PATENT DOCUMENTS

| 5,755,212 A | 5/1998 | Ajima | |
|---|---|---|---|
| 6,305,343 B1 * | 10/2001 | Sato et al. | 123/198 DB |
| 6,941,936 B2 * | 9/2005 | Yasui et al. | 123/674 |
| 7,677,222 B2 * | 3/2010 | Ishikawa | 123/299 |
| 2007/0023020 A1 | 2/2007 | Yoshidome | |
| 2010/0179745 A1 * | 7/2010 | Nakayama et al. | 701/108 |

FOREIGN PATENT DOCUMENTS

| JP | 8061112 A | 3/1996 |
|---|---|---|
| JP | 9088685 A | 3/1997 |
| JP | 11236857 A | 8/1999 |
| JP | 2002227687 A | 8/2002 |
| JP | 2007239644 A | 9/2007 |
| WO | WO-2008146127 A2 | 12/2008 |

* cited by examiner

*Primary Examiner* — Marc Armand
*Assistant Examiner* — Ricky Ngon
(74) *Attorney, Agent, or Firm* — Gifford, Krass, Sprinkle, Anderson & Citkowski, P.C.

(57) ABSTRACT

The invention is applied to an internal combustion engine in which fuel cut control is performed. The internal combustion engine has an exhaust gas recirculation system including: an exhaust gas recirculation passage that connects an intake and exhaust passage of the engine; and an exhaust gas recirculation valve that changes a cross section of the exhaust gas recirculation passage. A correlation, which holds during a predetermined period of time immediately after fuel cut control is stopped, between engine rotation speed NE and an index value indicating the amount of burned gas contained in the recirculated exhaust gas that passes through the exhaust gas recirculation valve (S101 to S104). The correlation is stored in an electronic control unit in advance (S105). Immediately after the fuel cut control is stopped, the index value indicating the burned gas amount is computed from the correlation stored in the electronic control unit based on the engine rotation speed NE.

10 Claims, 6 Drawing Sheets

F I G . 1
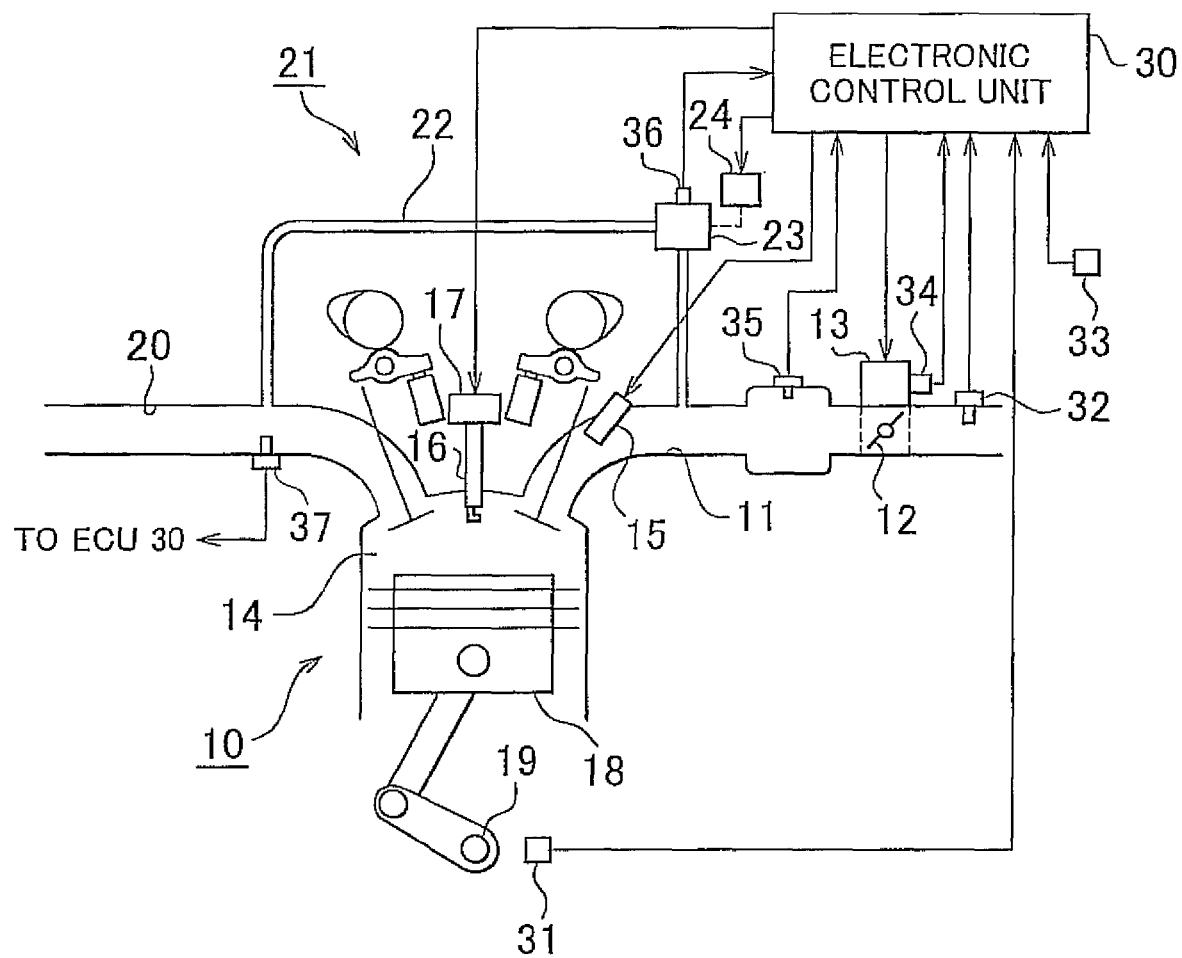

BURNED-GAS PASSAGE AMOUNT COMPUTING METHOD AND SYSTEM USED IN EXHAUST GAS RECIRCULATION SYSTEM

CROSS-REFERENCE TO RELATED APPLICATIONS

This application is the U.S. national phase of PCT/IB2009/006442 filed Aug. 4, 2009, which claims priority of Japanese Patent Application No. 2008-231386 filed Sep. 9, 2008, which is herein incorporated by reference in its entirety including the specification, claims, and drawings.

BACKGROUND OF THE INVENTION

1. Field of the Invention

The invention relates to a burned-gas passage amount computing method and system, used in an exhaust gas recirculation system, that compute the amount of burned gas contained in recirculated exhaust gas.

2. Description of the Related Art

For the purpose of reducing fuel consumption and emission, it is widely practiced to provide an internal combustion engine with an exhaust gas recirculation (EGR) system for recirculating exhaust gas in an exhaust passage of the internal combustion engine into an intake passage thereof. The EGR system includes an EGR passage that connects an intake passage and an exhaust passage and an EGR valve that is provided in the EGR passage and changes the cross section of the EGR passage. By adjusting the degree of opening of the EGR valve according to the engine operating conditions (engine load and engine rotation speed, for example), the amount of gas (EGR gas) returned from the exhaust passage to the intake passage through the EGR system is regulated to the amount appropriate in view of the engine operating conditions.

On the other hand, in the control of operation of an internal combustion engine, so-called fuel cut control is performed, in which fuel supply is temporarily stopped during an operating condition (during deceleration, for example) in which there is no need to output torque. While the fuel cut control is performed, intake air (oxygen-rich air) is discharged into the exhaust passage, so that a condition is created in which there is little amount of burned gas (oxygen-poor gas formed after combustion). Thus, when the fuel cut control is stopped while the EGR valve is open, although temporarily, an air-rich EGR gas is recirculated into the intake passage through the EGR passage. Thus, the amount of air taken into the engine combustion chamber increases and the air-fuel ratio of a mixture becomes unnecessarily lean, so that the operation of the engine can become unstable.

Systems have already been proposed that estimate the ratio of burned gas (burned gas ratio) contained in the EGR gas based on the detection signal from an oxygen concentration sensor for detecting the concentration of oxygen in exhaust gas and perform engine control according to the burned gas ratio thus estimated (see Japanese Patent Application Publications No. 11-236857 and 8-61112 (JP-A-11-236857, JP-A-8-61112), for example). With such a system, the occurrence of a situation is suppressed in which the air-fuel ratio of the mixture becomes lean due to the air contained in the EGR gas, so that it becomes possible to suppress the unstabilization of the operation of the engine.

The concentration of oxygen in the exhaust gas is very high while fuel cut control is performed. However, there is a limit to the concentration of oxygen in exhaust gas that the oxygen concentration sensor can detect. For this reason, when the burned gas ratio is determined based on the signal from the oxygen concentration sensor at each time point, the oxygen concentration cannot be accurately detected and the burned gas ratio cannot be correctly determined if the concentration of oxygen in the exhaust gas goes beyond the detectable range of the oxygen concentration sensor immediately after the fuel cut control is stopped.

Thus, for the purpose of avoiding the unstabilization of operation of the engine due to the influence of the unburned gas contained in the EGR gas, there is a room for improvement even in the case of the above-described system in which the burned gas ratio is determined, based on the signal from the oxygen concentration sensor.

SUMMARY OF THE INVENTION

The invention provides a burned-gas passage amount computing method and system, used in an exhaust gas recirculation system, which compute, with improved accuracy, the amount of burned gas in EGR gas after fuel cut control is stopped.

A first aspect of the invention is a burned-gas passage amount computing method used in an exhaust gas recirculation system of an internal combustion engine in which fuel cut control is performed in which fuel supply is temporarily stopped when a condition for performing the fuel cut control is satisfied, the exhaust gas recirculation system including: an exhaust gas recirculation passage that connects an intake passage and an exhaust passage of the internal combustion engine; and an exhaust gas recirculation valve that changes a cross section of the exhaust gas recirculation passage, in which method an index value indicating an amount of burned gas contained in recirculated exhaust gas that passes through the exhaust gas recirculation valve is computed. The method includes: a storing step of determining a correlation, which holds during a predetermined period of time immediately after the fuel cut control is stopped, between engine rotation speed and the index value and storing the correlation in a storage device in advance; and a computing step of computing the index value from the correlation stored in the storage device, based on an engine rotation speed immediately after the fuel cut control is stopped.

When the fuel cut control is stopped and fuel supply is started, the amount of burned gas contained in the EGR gas that passes through the exhaust gas recirculation (EGR) valve increases with the change in the amount of fuel supply, while there is a response delay (almost first order delay). During this, the higher the flow speed of the intake air or the exhaust gas is, that is, the higher the engine rotation speed is, the higher the speed of increase in the amount of burned gas is.

With the above computing method, it is possible to determine the correlation between the engine rotation speed and the index value indicating the amount of burned gas contained in the EGR gas that passes through the EGR valve and store the correlation in advance, with the influence of the response delay and the engine rotation speed taken into consideration. Then, it is possible to compute the index value indicating the burned gas amount based on the engine rotation speed at each time point. Thus, it is possible to accurately compute the index value indicating the amount of burned gas in EGR gas, that is, the amount of the burned gas immediately after the fuel cut control is stopped.

As the index value, the amount of burned gas contained in the recirculated exhaust gas that passes through the exhaust gas recirculation valve, the ratio of air contained in the recirculated exhaust gas, the index value indicating the ratio, the ratio of the burned gas contained in the recirculated exhaust gas that passes through the exhaust gas recirculation valve, may be used. Instead, an index value that indicates the ratio of burned gas contained in the recirculated exhaust gas that passes through the exhaust gas recirculation valve to the recirculated exhaust gas may be used as the index value.

As the method of determining the correlation, a method may be adopted in which in an internal combustion engine that has, in the exhaust passage thereof, an air-fuel ratio sensor for detecting an air-fuel ratio based on a concentration of oxygen in exhaust gas, the correlation is determined by setting, in advance, a model equation that represents a correlation, in which the ratio of the burned gas is an unknown and which holds immediately after the fuel cut control is stopped, between the air-fuel ratio detected by the air-fuel ratio sensor and an air-fuel ratio of a mixture in an engine combustion chamber, and determining, a plurality of times, the variation of the ratio of the burned gas that satisfies the model equation, based on the variation of the air-fuel ratio monitored with the use of the air-fuel ratio sensor while the engine rotation speed is varied.

In the burned-gas passage amount computing method used in an exhaust gas recirculation system according to the first aspect, the following equation may be set as the model equation:

$$AbyF = F([Klall + G\{(1.0 - H(t)) \times Klegr\}]/Qr),$$

where the air-fuel ratio detected by the air-fuel ratio sensor is "AbyF", a transfer function of the air-fuel ratio AbyF with respect to variation in the air-fuel ratio of the mixture in the engine combustion chamber is "F(t)", the amount of recirculated exhaust gas that passes through the exhaust gas recirculation valve is "Klegr", a transfer function of the amount of recirculated exhaust gas that is taken into the engine combustion chamber with respect to variation in the amount Klegr is "G(t)", a transfer function of the ratio of the burned gas with respect to the variation in the air-fuel ratio of the mixture in the engine combustion chamber is "H(t)", the amount of fuel supplied to the engine combustion chamber is "Qr", and the amount of air taken into the engine combustion chamber, from which the amount of air taken into the engine combustion chamber through the exhaust gas recirculation passage has been subtracted, is "Klall".

In the above model equation, "AbyF" is a value that is detected by the air-fuel ratio sensor, "Klegr", "Qr", and "Klall" are the values that can be obtained based on the operating conditions of an internal combustion engine, and "G(t)" and "F(t)" are the values that can be obtained based on the results of experiments and simulations. Thus, in the above computing method, it is possible to make the above model equation an equation in which the transfer function H(t) only is the unknown.

Thus, with the above computing method, it is possible to obtain the transfer function H(t) of the burned gas ratio with respect to the variation in the air-fuel ratio of the mixture in the combustion chamber with the use of the model equation, and therefore, it is possible to determine the correlation between the engine rotation speed and the index value indicating the burned gas ratio based on the transfer function H(t).

The burned-gas passage amount computing method used in an exhaust gas recirculation system may further include, before determining the correlation, a determining step of determining the transfer function F(t) from the model equation based on the air-fuel ratio detected by the air-fuel ratio sensor while the exhaust gas recirculation valve is closed.

With the above configuration, situation can be created in which the EGR valve is closed, that is, a situation can be created in which there is no need to take account of the amount of burned gas that passes through the EGR valve, nor to take account of the transfer functions G(t) and H(t) because the EGR gas is not taken into the engine combustion chamber through the EGR passage, so that it becomes possible to obtain the transfer function F(t) with the use of the model equation under such a situation.

In the burned-gas passage amount computing method used in an exhaust gas recirculation system, in the storing step, a correlation such that a value computed as the index value shows a trend that the higher the engine rotation speed is, the higher the speed of increase in the amount of burned gas is, may be stored as the correlation.

With this computing method, it becomes possible to accurately compute the index value of the burned gas in accordance with the trend that the higher the engine rotation speed is, the higher the speed of increase in the amount of burned gas in the EGR gas that passes through the EGR passage is.

In the burned-gas passage amount computing method used in an exhaust gas recirculation system according to the above first aspect, the storing step may be performed before the internal combustion engine is shipped from a factory.

With the above computing method, an internal combustion engine will be shipped from a manufacturing plant or a repair shop in a state where the correlation, used to compute the index value, between engine rotation speed and the index value is stored in advance, so that it becomes possible to accurately compute the amount of the burned gas after shipment.

A second aspect of the invention is a burned-gas passage amount computing system used in an exhaust gas recirculation system of an internal combustion engine in which fuel cut control is performed in which fuel supply is temporarily stopped when a condition for performing the fuel cut control is satisfied, the exhaust gas recirculation system including: an exhaust gas recirculation passage that connects an intake passage and an exhaust passage of the internal combustion engine; and an exhaust gas recirculation valve that changes a cross section of the exhaust gas recirculation passage, in which system an index value indicating an amount of burned gas contained in recirculated exhaust gas that passes through the exhaust gas recirculation valve is computed. The system includes: a storage means in which a correlation is stored in advance, which holds during a predetermined period of time immediately after the fuel cut control is stopped, between engine rotation speed and the index value; and a computing means that computes the index value from the correlation based on an engine rotation speed immediately after the fuel cut control is stopped.

When fuel cut control is stopped and fuel supply is started, the amount of burned gas contained in the EGR gas that passes through the exhaust gas recirculation (EGR) valve increases with the change in the amount of fuel supply, while there is a response delay (almost first order delay). During this, the higher the flow speed of the intake air or the exhaust gas is, that is, the higher the engine rotation speed is, the higher the speed of increase in the amount of burned gas is.

With this configuration, it is possible to accurately compute the index value indicating the amount of burned gas, that is, it is possible to accurately compute the amount of burned gas with the influence of the response delay and the engine rotation speed taken into consideration, based on the correlation between the engine rotation speed and the index value indicating the amount of burned gas in the EGR gas that passes through the EGR valve.

In the burned-gas passage amount computing system used in an exhaust gas recirculation system according to the second aspect, the computing means computes, as the index value, a value that shows a trend that the higher the engine rotation speed is, the higher the speed of increase in the amount of burned gas is.

With this configuration, it becomes possible to accurately compute the index value of the burned gas in accordance with the trend that the higher the engine rotation speed is, the higher the speed of increase in the amount of burned gas in the EGR gas that passes through the EGR passage is.

As the index value, the amount of burned gas contained in the recirculated exhaust gas that passes through the exhaust gas recirculation valve, the ratio of air contained in the recirculated exhaust gas, the index value indicating this ratio, the ratio of the burned gas contained in the recirculated exhaust gas that passes through the exhaust gas recirculation valve, may be used. Instead, an index value that indicates the ratio of burned gas contained in the recirculated exhaust gas that passes through the exhaust gas recirculation valve to the recirculated exhaust gas may be used as the index value.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 1 is a schematic diagram showing a schematic configuration of an internal combustion engine in which an embodiment of the invention is used;

DETAILED DESCRIPTION OF EMBODIMENTS

Figure 2:
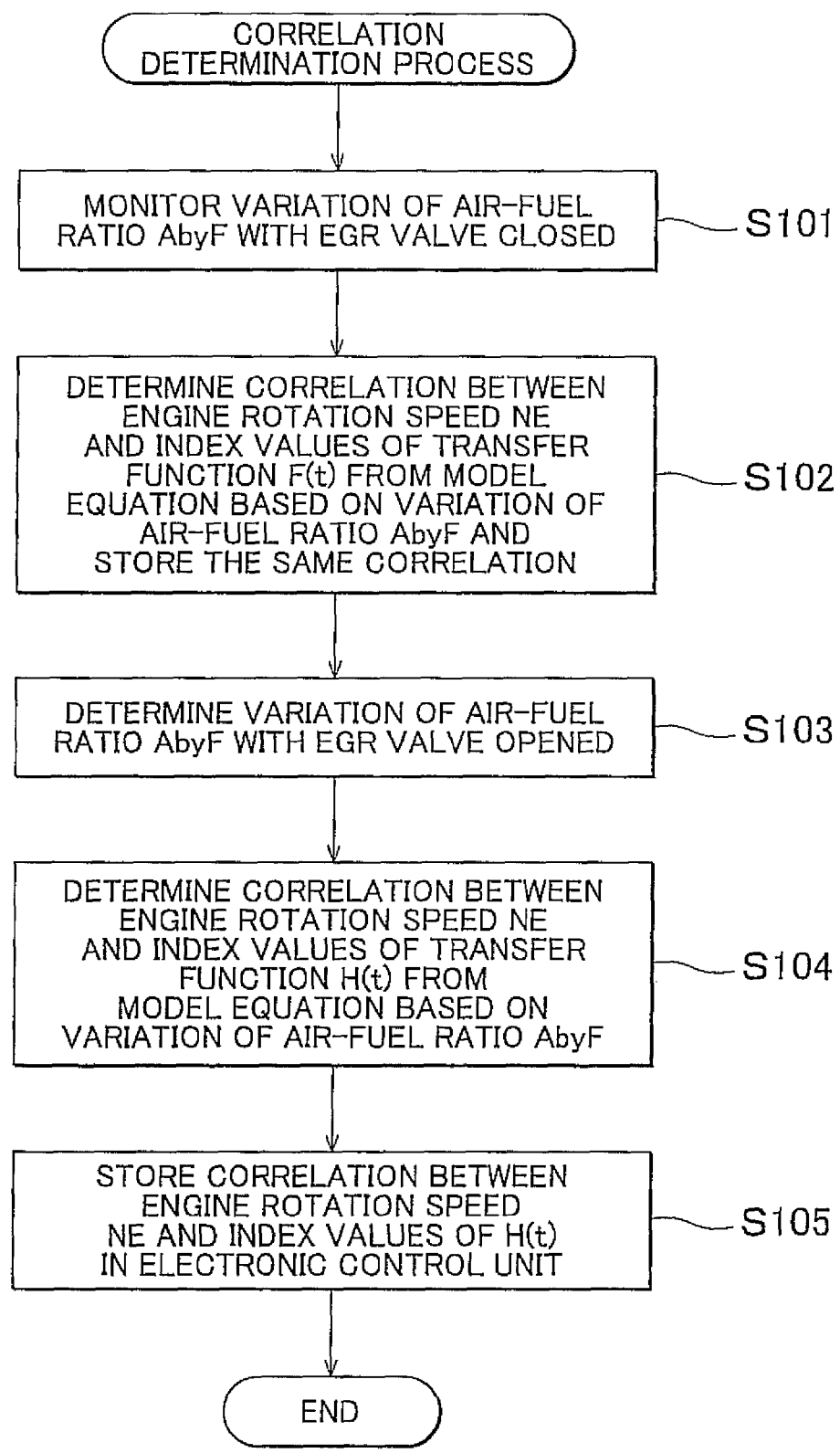
FIG. 2 is a flow chart showing a procedure of operations for determining a correlation.

An embodiment of the invention will be described below. FIG. 1 shows a schematic configuration of an internal combustion engine provided with an exhaust gas recirculation system according to the embodiment.

As shown in FIG. 1, an intake passage 11 of the internal combustion engine 10 is provided with a throttle valve 12. A throttle motor 13 is connected to the throttle valve 12. The degree of opening of the throttle valve 12 (throttle opening degree TA) is adjusted by drive control (throttle control) of the throttle motor 13 and the amount of air taken into a combustion chamber 14 through the intake passage 11 is thus regulated. In addition, a fuel injection valve 15 is provided in the intake passage 11. Fuel is injected into the intake passage 11 by drive control (fuel injection control) of the fuel injection valve 15.

The internal combustion engine 10 is provided with a spark plug 16 for igniting the mixture of the intake air and the injected fuel in the combustion chamber 14. An igniter 17 is connected to the spark plug 16. The spark plug 16 fires when a high voltage output from the igniter 17 is applied to the spark plug 16. Owing to the control of operation (ignition timing control) of the igniter 17, the mixture burns at appropriate timing to cause a piston 18 to reciprocate and a crankshaft 19 rotates, which functions as the output shaft of the internal combustion engine 10. Then, the mixture after combustion (burned gas) is discharged as the exhaust gas from the combustion chamber 14 into an exhaust passage 20.

In addition, the internal combustion engine 10 is provided with an exhaust gas recirculation (EGR) system 21 for returning, to the intake passage 11, part of the exhaust gas flowing through the exhaust passage 20. The EGR system 21 includes: an EGR passage 22 that connects the exhaust passage 20 and the part of the intake passage 11 downstream of the throttle valve 12; an EGR valve 23 provided on the EGR passage 22; and an EGR actuator 24 for controlling the degree of opening of the EGR valve 23. In the control of operation of the EGR system 21 (EGR control), the operation of the EGR actuator 24 is controlled to control the degree of opening of the EGR valve 23 (EGR opening degree) according to the engine operating conditions, whereby the amount (EGR amount) of the exhaust gas (EGR gas) that is recirculated through the EGR passage 22 is regulated.

The system of this embodiment is provided with various sensors. The various sensors include, for example: a crank sensor 31 for detecting a rotation speed (engine rotation speed NE) of the crankshaft 19 of the internal combustion engine 10; an intake air amount sensor 32 for detecting the amount of intake air (passage intake air amount GAp) that passes through the intake passage 11; and an accelerator sensor 33 for detecting the depression amount AC of an accelerator pedal (not shown). In addition, a throttle sensor 34 for detecting the throttle opening degree TA and a pressure sensor 35 for detecting a pressure of intake air (intake air pressure PM) in the intake passage 11 downstream of the throttle valve 12, are provided. Moreover, an opening degree sensor 36 for detecting the EGR opening degree, an air-fuel ratio sensor 37, provided in the exhaust passage 20, for detecting the air-fuel ratio AbyF of the mixture based on the oxygen concentration in the exhaust gas, etc. are also provided.

The system of this embodiment is provided with an electronic control unit 30 including a microcomputer, for example. The electronic control unit 30 receives detection signals from the various sensors and performs various computations. Based on the result of the computations, various control operations, such as throttle control, fuel injection control, ignition timing control, and EGR control, are performed. In this embodiment, the electronic control unit 30 functions as the storage device and the storage means.

The throttle control is performed as follows. Specifically, first, the target throttle opening degree Tta is computed based on the accelerator pedal depression amount AC and the engine rotation speed NE at each time point. Then, drive of the throttle motor 13 is controlled so that the target throttle opening degree Tta and an actual throttle opening degree TA coincide with each other. Through such throttle control, the amount of air taken into the combustion chamber of the internal combustion engine 10 (cylinder intake air amount GAc) is regulated to the amount appropriate in view of the operating conditions.

The fuel injection control is performed as follows. First, the target amount of fuel injection Tq (the amount corresponding to the fuel injection amount by which the air fuel ratio of the mixture is brought to a desired ratio (14.6, for example)) is computed based on the cylinder intake air amount GAc and the engine rotation speed NE. Then, the fuel injection valve 15 is driven to be opened so that the target fuel injection amount Tq and an actual fuel injection amount Q coincide with each other.

In the fuel injection control, fuel cut control is executed in which the fuel injection from the fuel injection valve 15 is temporarily stopped when conditions for execution are satisfied. Whether the execution conditions are satisfied is determined based on whether the following conditions are all satisfied.

The accelerator pedal is not depressed;
The engine rotation speed NE is decreasing; and
The engine rotation speed NE falls within a predetermined range (1700 to 4000 rpm, for example).

Although it is possible to detect the cylinder intake air amount GAc with the use of the intake air amount sensor 32 provided in the intake passage 11, when the intake air amount is detected with the use of such a sensor, there is a possibility that the detection accuracy is reduced because of a response delay due to the variation in the amount of intake air caused as the engine operating conditions change and/or because of a detection error due to the influence of the intake air pulsation. It is also possible to estimate the cylinder intake air amount GAc by constructing a physical model in which the parameters are the throttle opening degree TA, the EGR opening degree, the engine rotation speed NE, the diameter and the length of the intake passage 11, the diameter and the length of the EGR passage 22, etc. When such a physical model is appropriately constructed and the intake air amount is estimated using the physical mode, it is possible to suppress the occurrence of the response delay and the detection error as described above. In view of such points, in this embodiment, the cylinder intake air amount GAc is estimated using such a physical model (hereinafter referred to as the air model).

The EGR control is performed as follows. Specifically, first, a target control value (target EGR opening degree) of the EGR opening degree is computed based on the passage intake air amount GAp and the engine rotation speed NE at each time point. The operation of the EGR actuator 24 is controlled so that the target EGR opening degree and an actual EGR opening degree coincide with each other. Through such EGR control, the EGR amount is regulated to the amount appropriate in view of the operating conditions of the internal combustion engine 10.

In this embodiment, determination control for determining whether there is an abnormality in the EGR valve 23 is executed as follows. Specifically, first, on the condition that the fuel cut control is being executed, an intake air pressure PM is detected both when the EGR valve 23 is closed and when the EGR valve 23 is opened, and the difference between these intake air pressures PM is calculated. Then, when this difference is equal to or greater than a predetermined threshold value, it is determined that there is no abnormality in the EGR valve 23, and when this difference is less than the threshold value, it is determined that there is an abnormality in the EGR valve 23.

As described above, because there is little amount of burned gas in the exhaust passage 20 while the fuel cut control is performed, when the fuel cut control is stopped and the EGR valve 23 is opened, the EGR gas containing a lot of air is thereafter recirculated to the intake passage 11 through the EGR passage 22. Thus, the amount of air taken into the combustion chamber 14 increases and the air-fuel ratio of the mixture becomes unnecessarily lean, which can make the operation of the internal combustion engine 10 unstable. In this embodiment, for example, when the EGR valve 23 is opened and the fuel cut control is stopped while the determination control is performed, such a situation occurs.

In order to suppress such a problem, in this embodiment, the correlation, which holds during a predetermined period of time immediately after the fuel cut control is stopped, between the engine rotation speed NE and the index value indicating the ratio of the burned gas (burned gas ratio R) contained in the EGR gas that passes through the EGR valve 23 is stored in the electronic control unit 30 in advance. Immediately after the fuel cut control is stopped, the burned gas ratio R (more specifically, the index value thereof) is computed from the correlation based on the engine rotation speed NE, and the cylinder intake air amount GAc is determined based on the burned gas ratio R.

The reason why the engine rotation speed NE is used as the parameter for computing the burned gas ratio R is as follows. When the fuel cut control is stopped and the fuel injection by the fuel injection valve 15 is started, the amount of burned gas contained in the EGR gas that passes through the EGR valve 23 increases with the change in the amount of fuel supply to the internal combustion engine 10, while there is a response delay (almost first order delay). During this, the higher the flow speed of the intake air or the exhaust gas is, that is, the higher the engine rotation speed NE is, the higher the speed of increase in the amount of burned gas is. For this reason, when the burned gas ratio R is computed using the engine rotation speed NE as a computation parameter as in the case of this embodiment, the burned gas ratio R is accurately computed with the influence of the response delay and/or the engine rotation speed NE taken into consideration.

In this embodiment, the above correlation is determined by conducting experiments and simulations. In this embodiment, the operations for determining the correlation and storing the correlation in the electronic control unit 30 are performed before shipment of the internal combustion engine 10 from a factory. Thus, the internal combustion engine 10, in which the correlation used to compute the burned gas ratio R has been stored in the electronic control unit 30 in advance, is shipped from a manufacturing plant or a repair shop, so that the burned gas ratio R, that is, the cylinder intake air amount GAc is accurately computed after the shipment.

The procedure of the operations for determining the correlation will be described below with reference to the flow chart shown in FIG. 2. In this embodiment, in order to determine the above correlation, a model equation (1) shown below is set in advance that represents the correlation between the air-fuel ratio AbyF that is detected by the air-fuel ratio sensor 37 and the air-fuel ratio of the mixture in the combustion chamber 14 immediately after the fuel cut control is stopped.

$$AbyF = F([Klall + G\{(1.0 - H(t)) \times Klegr\}]/Qr) \quad (1)$$

The following quantities are defined as the variables of the model equation (1).

"F(t)", which is the transfer function of the air-fuel ratio AbyF with respect to the variation in the air-fuel ratio of the mixture in the combustion chamber 14;

"Klegr", which is the amount of EGR gas that passes through the EGR valve 23;

"G(t)", which is the transfer function of the amount of EGR gas that is taken into the combustion chamber 14 with respect to the variation in the above amount Klegr;

"H(t)", which is the transfer function of the burned gas ratio R with respect to the variation in the air-fuel ratio of the mixture in the combustion chamber 14;

"Qr", which is the amount of fuel supplied to the combustion chamber 14; and

"Klall", which is the amount of the air taken into the combustion chamber 14, from which the amount of air taken into the combustion chamber 14 through the EGR passage 22 has been subtracted.

Of these variables, the air-fuel ratio AbyF is the value that is detected by the air-fuel ratio sensor 37, the EGR gas amount Klegr is accurately determined based on the EGR opening degree and the intake air pressure PM, and the fuel amount Qr is accurately determined based on the fuel injection amount and the time taken for the fuel to travel from the fuel injection valve 15 to the combustion chamber 14.

In this embodiment, before the operation of setting the correlation is performed, the air model is set by conducting experiments and simulations. The air model is a model equation that holds when all the EGR as is burned gas and that includes the transfer function G(t). With this air model, it is possible to accurately compute the value Klall. Thus, of the above variables, the transfer function G(t) and the value Klall are accurately determined after the air model is set, that is, when the operations for determining the correlation are performed. Accordingly, the model equation (1) is the equation in which the unknowns are the transfer functions F(t) and H(t) only.

When the correlation is determined, first, the operations for determining the transfer function F(t) are performed. Because the burned gas amount Klegr becomes zero when the EGR valve 23 is closed, the above model equation (1) can be transformed to the following model equation (2).

$$AbyF=F(Klall/Qr) \quad (2)$$

The model equation (2) is an equation in which the unknown is the transfer function F(t) only. Thus, by substituting values for the variables (AbyF, Klall, Qr) other than the transfer function F(t), it is possible to obtain the transfer function F(t) with the use of the model equation (2). It has been confirmed by the inventors that the transfer function F(t) is hardly affected by the EGR opening degree.

In view of such points, in this embodiment, in order to determine the transfer function F(t) of the model equation (1), the variation of the air-fuel ratio AbyF after the fuel cut control is stopped is monitored with the EGR valve 23 closed (step S101 in FIG. 2). In the case of this embodiment, the variation of the air-fuel ratio AbyF is monitored under various engine operating conditions in each of which the engine rotation speed NE differs. The transfer function F(t) is determined from the model equation (2) based on the variation of the air-fuel ratio AbyF for each of the engine operating conditions, and the correlation between the transfer function F(t) and the engine rotation speed NE is determined (step S102). In this embodiment, the steps S101 and S102 function as the determining step.

When the fuel cut control is stopped and fuel supply by the fuel injection valve 15 is started, the concentration of oxygen in the exhaust gas that reaches the air-fuel ratio sensor 37 decreases with the change in the amount of fuel supply (specifically, the fuel amount Qr), while there is a response delay (almost first order delay). Thus, it can be said that the transfer function F(t) can be determined using the dead time and the time constant. In consideration of this point, in this embodiment, as the correlation between the transfer function F(t) and the engine rotation speed NE, determined and stored are the correlation between the dead time of the transfer function F(t) and the engine rotation speed NE and the correlation between the time constant of the transfer function F(t) and the engine rotation speed NE. The dead time is the time taken from when the fuel amount Qr starts varying due to the stop of the fuel cut control to when the concentration of the oxygen in exhaust gas that reaches the air-fuel ratio sensor 37 starts varying. The time constant is the time taken from when the concentration of the oxygen in exhaust gas that reaches the air-fuel ratio sensor 37 starts varying to when a value corresponding to the concentration of the oxygen reaches 0.63 on the assumption that the value corresponding to the concentration of oxygen in the exhaust gas when no fuel is supplied into the combustion chamber 14 is zero and the value corresponding to the concentration of oxygen in the exhaust gas when the air-fuel ratio of the mixture is the stoichiometric air-fuel ratio is 1.00.

In step S102, the operations for determining the transfer function F(t) are performed as follows. By multiplying the reciprocal of the air-fuel ratio (=1/AbyF) that is detected with the use of the air-fuel ratio sensor 37 by the above air amount Klall obtained using the air model, it is possible to compute the value indicative of the fuel amount (hereinafter referred to as the fuel amount indicating value (actual)).

By multiplying the reciprocal of the stoichiometric air-fuel ratio by the air amount Klall, a value corresponding to the fuel amount indicating value (actual) when the air-fuel ratio AbyF detected by the air-fuel ratio sensor 37 is the stoichiometric air-fuel ratio (hereinafter referred to as the fuel amount indicating value (stoichiometric)) can also be computed. While the variation of the air-fuel ratio AbyF is monitored in step S101, the throttle opening degree TA and the engine rotation speed NE are both constant and the EGR valve 23 is closed, so that the air amount Klall, that is, the amount of the fuel amount indicating value (stoichiometric) is constant.

In this embodiment, the ratio of the fuel amount indicating value (actual) to the fuel amount indicating value (stoichiometric) when the fuel amount indicating value (stoichiometric) is 1.00 (=fuel amount indicating value (actual)/fuel amount indicating value (stoichiometric)) (hereinafter referred to as VR) is determined and used to determine the transfer function F(t).

Figure 3:
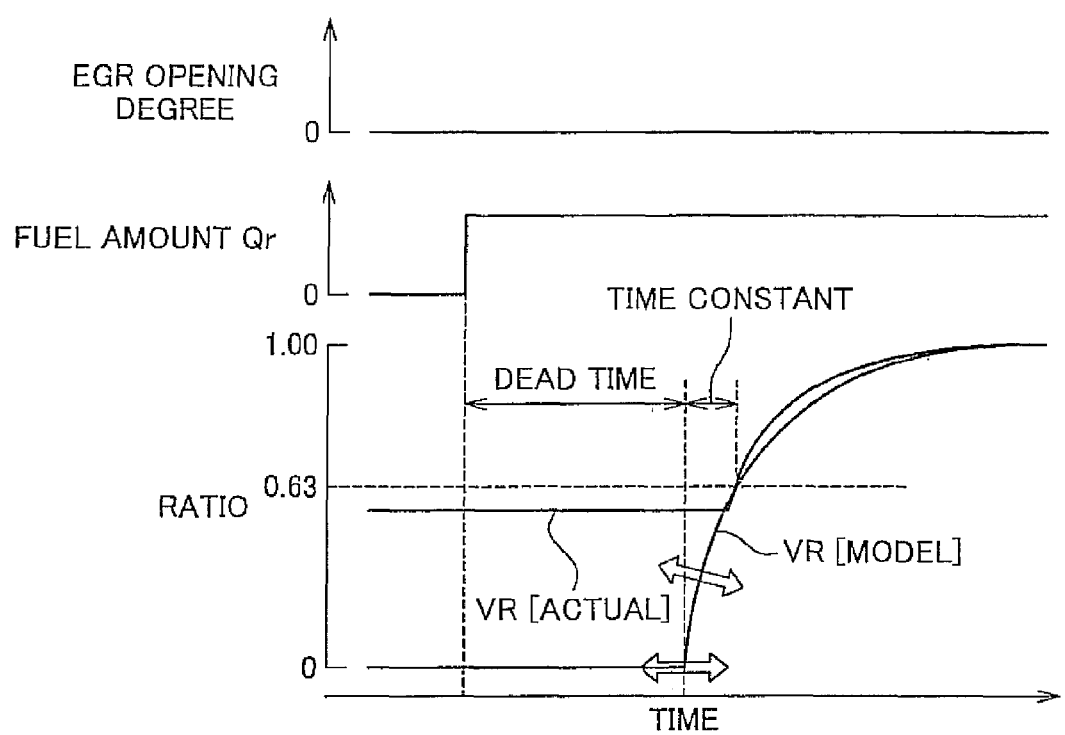
FIG. 3 is a time chart showing an example of the transition of operational parameters used when operations for determining a transfer function F(t) are performed.

FIG. 3 shows an example of the variation of the operational parameters used when the operations for determining the transfer function F(t) are performed. As shown in FIG. 3, in determining the transfer function F(t), first, the variation of the air-fuel ratio AbyF is monitored by the air-fuel ratio sensor 37 with the EGR valve 23 closed in step S101 and the air amount Klall is determined with the use of the air model. Then, the variation of the above ratio (VR(actual)) is determined based on the variation of the air-fuel ratio AbyF and the air amount Klall.

The variation of the ratio (VR(model)) is determined based on the variation of the value corresponding to the calculated air-fuel ratio AbyF by substituting the fuel amount Qr determined based on the target fuel injection amount Tq and the air amount Klall into the model equation (2) and setting a predetermined function (specifically, the function of the dead time and the time constant) as the transfer function F(t) of the model equation (2).

The ratio VR(model) varies as shown by the open arrow in FIG. 3 depending on the function substituted for the transfer function F(t). In consideration of this point, in step S102, the variation of the ratio VR(model) is repeatedly determined while the predetermined function substituted for the transfer function F(t) is varied. Every time the variation of the ratio VR(model) is determined, the mean square errors of the ratio VR(actual) and the ratio VR(model) are computed, the function that gives the minimum mean square error is determined based on the computation result, and this function is determined as the transfer function F(t).

Such operations for determining the transfer function F(t) are performed by the simulation that is conducted with the use of the control program written and stored in an external device in advance, using the variation of the air-fuel ratio AbyF monitored in step S101 in FIG. 2 as the computation parameter.

After the transfer function F(t) is determined in this way, the operations for determining the correlation, which holds during a predetermined period of time immediately after the fuel cut control is stopped, between the engine rotation speed NE and the index value indicating the burned gas ratio R, are performed.

Because the transfer function F(t) is determined through steps S101 and S102, the model equation (1) becomes an equation in which the transfer function H(t) only is the unknown. Thus, in this embodiment, the variation of the air-fuel ratio AbyF after the fuel cut control is stopped is determined with the EGR valve 23 opened the predetermined opening degree (step S103). In this embodiment, the determination of the variation of the air-fuel ratio AbyF is performed under various engine operating conditions in each of which the engine rotation speed NE differs. After the transfer function H(t) is determined from the model equation (1) based on the variation of the air-fuel ratio AbyF for each of the engine operating conditions, the correlation between the transfer function H(t) and the engine rotation speed NE is determined (step S104).

As described above, when the fuel cut control is stopped and the fuel supply by the fuel injection valve 15 is started, the amount of burned gas contained in the EGR gas that passes through the EGR valve 23 increases with the change in the amount of fuel supply (more specifically, the fuel amount Qr), while there is a response delay (almost first order delay). Thus, it is possible to determine the transfer function H(t) based on the dead time and the time constant.

In consideration of this point, in this embodiment, as the correlation between the transfer function H(t) and the engine rotation speed NE, determined and stored are the correlation between the dead time of the transfer function H(t) and the engine rotation speed NE and the correlation between the time constant of the transfer function H(t) and the engine rotation speed NE. The above dead time is the time taken from when the fuel amount Qr starts varying due to the stop of the fuel cut control to when the concentration of oxygen in the EGR gas that passes through the EGR valve 23 starts varying. The time constant is the time taken from when the concentration of oxygen in the EGR gas that passes through the EGR valve 23 starts varying to when a value corresponding to the concentration of the oxygen reaches 0.63 on the assumption that the value corresponding to the concentration of oxygen in the exhaust gas when no fuel is supplied into the combustion chamber 14 is zero and the value corresponding to the concentration of oxygen in the exhaust gas when the air-fuel ratio of the mixture is the stoichiometric air-fuel ratio is 1.00.

Figure 4:
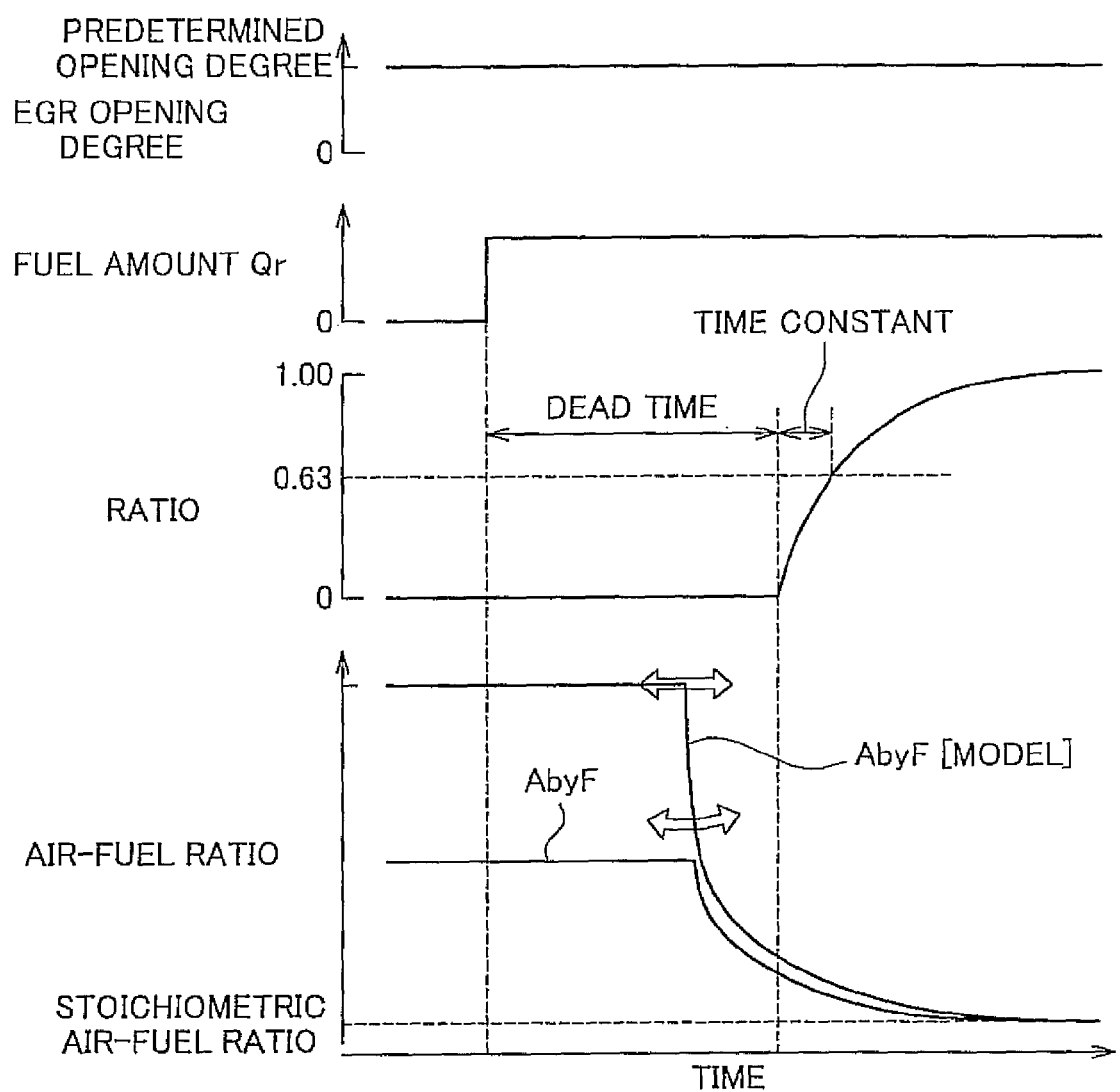
FIG. 4 is a time chart showing an example of the transition of operational parameters used when operations for determining a transfer function H(t) are performed.

In step S104, the operations for determining the transfer function H(t) are performed as follows. FIG. 4 shows an example of the variation of the operational parameters used in the operations for determining the transfer function H(t).

As shown in FIG. 4, in determining the transfer function H(t), first, the transfer function F(t) is determined based on the engine rotation speed NE and the correlation stored in step S102 (see FIG. 2), and the fuel amount Qr is determined based on the target fuel injection amount Tq. The air amount Klall is determined with the use of the air model, and the amount Klegr of the EGR gas that passes through the EGR valve 23 is determined based on the EGR opening degree and the intake air pressure PM.

The variation of the value (AbyF(model)) corresponding to the air-fuel ratio AbyF is determined by substituting the transfer function F(t), the fuel amount Qr, the air amount Klall, and the EGR gas amount Klegr into the model equation (1) and setting a predetermined function (specifically, the function of the dead time and the time constant) as the transfer function H(t) of the model equation (1).

The value AbyF(model) varies as shown by the open arrow in FIG. 4 depending on the function substituted for the transfer function H(t). In consideration of this point, in step S104 (see FIG. 2), the variation of the value AbyF(model) is repeatedly determined while the predetermined function substituted for the transfer function H(t) is varied. Every time the variation of the value AbyF(model) is determined, the mean square error between the value AbyF(model) and the air-fuel ratio AbyF detected in step S103 (see FIG. 2) is computed, the function that gives the minimum mean square error is determined based on the computation result, and this function is determined as the transfer function H(t).

Such operations for determining the transfer function H(t) are performed by the simulation that is conducted with the use of the control program written and stored in an external device in advance, using the variation of the air-fuel ratio AbyF determined in step S103 in FIG. 2 as the computation parameter.

The correlation between the transfer function H(t) thus obtained and the engine rotation speed NE is stored in the electronic control unit 30 (step S105). Specifically, the map that is used to compute the dead time of the transfer function H(t) and that defines the correlation between the dead time and the engine rotation speed NE (dead-time computing map), and the map that is used to compute the time constant of the transfer function H(t) and that defines the correlation between the time constant and the engine rotation speed NE (time-constant computing map) are stored. In this embodiment, the step S105 functions as the storing step, and the dead time and the time constant of the transfer function H(t) function as the index value indicating the burned gas amount and the index value indicating the burned gas ratio.

In this embodiment, when the fuel cut control is stopped while the EGR valve 23 is opened, such as when the fuel cut control is stopped while the EGR valve 23 is opened in the above-described determination control, for example, in computing the cylinder intake air amount GAc during a predetermined period of time after the fuel cut control is stopped, the dead-time computing map and the time-constant computing map are used. Note that the predetermined period of time is the time period until all the EGR gas that passes through the EGR valve becomes burned gas.

Specifically, first, the dead time is computed from the dead-time computing map based on the engine rotation speed NE and the time constant is computed from the time-constant computing map based on the engine rotation speed NE. Then, the burned gas ratio R of the EGR gas that passes through the EGR valve 23 is determined based on the dead time, the time constant, and the elapsed time since the fuel cut control is stopped. Then, the burned gas ratio R is multiplied by the amount of the EGR gas that passes through the EGR valve 23 to obtain the amount of burned gas contained in the EGR gas. Based on the amount of burned gas thus obtained and the transfer function G(t), the amount of the burned gas that is recirculated into the combustion chamber 14 is determined In addition, the cylinder intake air amount GAc is computed based on the amount of burned gas. In this embodiment, the step of computing the dead time and the time constant as described above functions as the computing step and the computing means.

Figure 5:
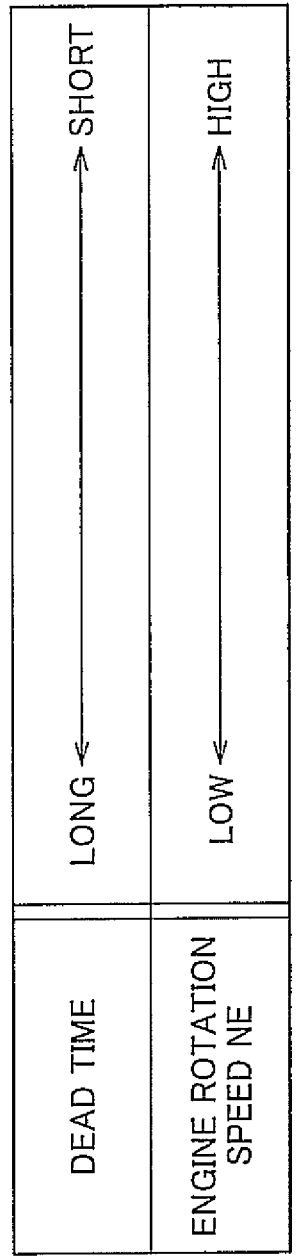
FIG. 5 is a schematic diagram showing a structure of a dead-time computing map.

As can be seen from the structure of the dead-time computing map shown in FIG. 5, in the dead-time computing map, a correlation such that the higher the engine rotation speed NE is, the shorter the time computed as the dead time is, that is, a correlation such that the value computed as the dead time shows the trend that the higher the engine rotation speed NE is, the higher the speed of increase in the burned gas ratio R is, is set.

Figure 6:
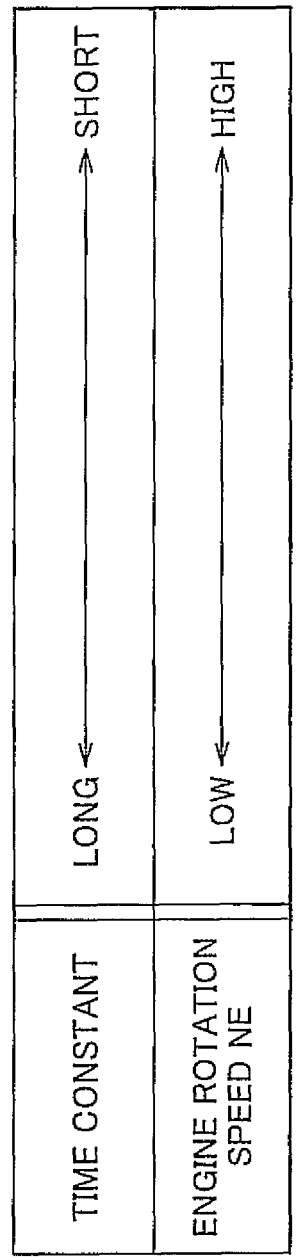
FIG. 6 is a schematic diagram showing a structure of a time-constant computing map.

As can be seen from the structure of the time-constant computing map shown in FIG. 6, in the time-constant computing map, a correlation such that the higher the engine rotation speed NE is, the shorter the time computed as the time constant is, that is, a correlation such that the value computed as the time constant shows the trend that the higher the engine rotation speed NE is, the higher the speed of increase in the burned gas ratio R is, is set.

In this embodiment, because such correlations are set in the dead-time computing map (FIG. 5) and the time-constant computing map (FIG. 6), the dead time and the time constant of the transfer function H(t) are accurately computed according to the trend that the higher the engine rotation speed NE is, the higher the speed of increase in the amount of burned gas in the EGR gas that passes through the EGR valve 22 is.

As described above, with this embodiment, the following effects are achieved.

(1) The correlations, which holds during the predetermined period of time immediately after the fuel cut control is stopped, between the engine rotation speed NE and the index values (the dead time and the time constant of the transfer function H(t)) of the burned gas ratio R are stored in the electronic control unit 30 in advance, and immediately after the fuel cut control is stopped, the burned gas ratio R is computed from the correlations based on the engine rotation speed NE. Thus, the index value indicating the burned gas ratio R, that is, the burned gas ratio R, is accurately computed with the influence of the engine rotation speed NE and the influence of the delay of response of the increase in the amount of burned gas contained in the EGR gas that passes through the EGR valve 23 to the variation in the amount of fuel supply taken into consideration.

(2) The model equation (1) is set in advance that represents the correlation between the air-fuel ratio AbyF detected by the air-fuel ratio sensor 37 and the air-fuel ratio of the mixture in the combustion chamber 14, which is the correlation in which the burned gas ratio R is the unknown and that holds immediately after the fuel cut control is stopped. The operation of determining the variation of the burned gas ratio R that satisfies the model equation (1) based on the variation of the air-fuel ratio AbyF is repeated a plurality of times while the engine rotation speed NE is changed, whereby the correlation between the index value indicating the burned gas ratio R and the engine rotation speed NE is determined. In this way, it is possible to determine the transfer function H(t) of the burned gas ratio R with respect to the variation in the air-fuel ratio of the mixture in the combustion chamber 14, and it is possible to determine the correlation between the engine rotation speed NE and the index value of the burned gas ratio R based on the transfer function H(t).

(3) Before the correlation between the engine rotation speed NE and the index value indicating the burned gas ratio R is determined, the transfer function F(t) is determined from the model equation (1) based on the air-fuel ratio AbyF that is detected by the air-fuel ratio sensor 37 while the EGR valve 23 is closed. Thus, the EGR gas is not taken into the combustion chamber 14 through the EGR passage 22, and it is therefore possible to bring about a state in which there is no need to take account of the amount Klegr of EGR gas that passes through the EGR valve 23, and the transfer functions G(t) and H(t). Therefore, it is possible to transform the model equation (1) to a model equation (2) in which the unknown is the transfer function F(t) only. Then, with the use of the model equation (2), it is possible to determine the transfer function F(t).

(4) The operations for determining the correlation between the engine rotation speed NE and the index value indicating the burned gas ratio R and storing the correlation in the electronic control unit 30 are performed before the shipment of the internal combustion engine 10 from the factory. Thus, it is possible to ship the internal combustion engine 10, in which the correlation used in computing the index value indicating the burned gas ratio R has been stored in the electronic control unit 30 in advance, from a manufacturing plant or a repair shop, so that it is possible to accurately compute the burned gas ratio R, that is, the cylinder intake air amount GAc after shipment.

(5) In the dead-time computing map, a correlation such that the value computed as the dead time shows the trend that the higher the engine rotation speed NE is, the higher the speed of increase in the burned gas ratio R is, is set. In the time-constant computing map, a correlation such that the value computed as the time constant shows the trend that the higher the engine rotation speed NE is, the higher the speed of increase in the burned gas ratio R is, is set. Thus, the dead time and the time constant of the transfer function H(t) are accurately computed according to the trend that the higher the engine rotation speed NE is, the higher the speed of increase in the amount of burned gas in the EGR gas that passes through the EGR valve 22 is.

The above embodiment may be modified as follows. (1) The operations for determining the correlation and storing the correlation in the electronic control unit 30 may be performed after the shipment of the internal combustion engine 10 from a factory.

(2) The method of determining the transfer function F(t) may be changed as needed. For example, instead of determining the correlation that makes the mean square error between the ratio VR(actual) and the ratio VR(stoichiometric) minimum and defining the correlation as the transfer function F(t), the correlation that makes the mean square error between the air-fuel ratio AbyF and the value corresponding to the air-fuel ratio AbyF obtained from the model equation (2) minimum may be determined and the correlation may be defined as the transfer function F(t). Alternatively, instead of using a mean square error in determining the transfer function F(t), a mean error may be used.

(3) When the transfer function H(t) is determined, as long as it is possible to accurately determine whether the difference between the value AbyF(model) and the air-fuel ratio AbyF is small, another error, such as a mean error, may be used instead of using the mean square error.

(4) Instead of the correlation between the engine rotation speed NE and the index value indicating the burned gas ratio R, the following correlations may be adopted: (Correlation A) The correlation between the elapsed time since the fuel amount Qr starts varying due to the stop of the fuel cut control, the engine rotation speed NE, and the burned gas ratio R; (Correlation B) The correlation between the elapsed time since the fuel amount Qr starts varying due to the stop of the fuel cut control, the engine rotation speed NE, and the amount of burned gas that passes through the EGR valve 23; (Correlation C) The correlation between the elapsed time since the fuel amount Qr starts varying due to the stop of the fuel cut control, the engine rotation speed NE, and the ratio of air contained in the EGR gas that passes through the EGR valve 23 to the EGR gas; (Correlation D) The correlation between the engine rotation speed NE and the index value indicating the ratio of air contained in the EGR gas that passes through the EGR valve 23 to the EGR gas; (Correlation E) The correlation between the elapsed time since the fuel amount Qr starts varying due to the stop of the fuel cut control, the engine rotation speed NE, and the ratio of air contained in the EGR gas that passes through the EGR valve 23 to the EGR gas; and (Correlation F) The correlation between the elapsed time since the fuel amount Qr starts varying due to the stop of the fuel cut control, the engine rotation speed NE, and the amount of air that passes through the EGR valve 23. Regardless of which of the Correlation A to Correlation F is adopted, it is possible to accurately compute the index value indicating the amount of burned gas according to the delay of response of the increase in the amount of burned gas contained in the EGR gas that passes through the EGR valve 23 to the variation in the fuel supply amount and/or the influence of the engine rotation speed NE, and it is therefore possible to accurately compute the cylinder intake air amount GAc based on the index value.

(5) The model equation is not limited to the model equation (1) and any model equations in which the amount of burned gas (or the index value indicating the same) contained in the EGR gas that passes through the EGR valve 23 is an unknown can be adopted. Also with this configuration, the correlation between the index value indicating the amount of burned gas contained in the EGR gas that passes through the EGR valve 23 and the engine rotation speed NE can be determined by performing the operations for determining the amount of burned gas (or the index value indicating the same) with the use of the model equation a plurality of times while varying the engine rotation speed NE.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single element, are also within the spirit and scope of the invention.

The invention claimed is:

1. A burned-gas passage amount computing method used in an exhaust gas recirculation system of an internal combustion engine in which fuel cut control is performed in which fuel supply is temporarily stopped when a condition for performing the fuel cut control is satisfied, the exhaust gas recirculation system including: an exhaust gas recirculation passage that connects an intake passage and an exhaust passage of the internal combustion engine; and an exhaust gas recirculation valve that changes a cross section of the exhaust gas recirculation passage, the method comprising:
providing an electronic control unit having an electronic storage device, the electronic control unit configured to:
determine a correlation, which holds during a predetermined period of time immediately after the fuel cut control is stopped, between engine rotation speed and an index value indicating an amount of burned gas contained in recirculated exhaust gas that passes through the exhaust gas recirculation valve;
store the determined correlation in the electronic storage device in advance; and
compute the index value from the correlation stored in the electronic storage device, based on an engine rotation speed immediately after the fuel cut control is stopped.

2. The burned-gas passage amount computing method used in an exhaust gas recirculation system according to claim 1, wherein the index value indicates a ratio of burned gas contained in the recirculated exhaust gas that passes through the exhaust gas recirculation valve to the recirculated exhaust gas.

3. The burned-gas passage amount computing method used in an exhaust gas recirculation system according to claim 1, wherein a correlation such that a value computed as the index value shows a trend that the higher the engine rotation speed is, the higher a speed of increase in the amount of burned gas is, is stored as the determined correlation.

4. The burned-gas passage amount computing method used in an exhaust gas recirculation system according to claim 1, wherein storing the determined correlation is performed before the internal combustion engine is shipped from a factory.

5. A burned-gas passage amount computing system used in an exhaust gas recirculation system of an internal combustion engine in which fuel cut control is performed in which fuel supply is temporarily stopped when a condition for performing the fuel cut control is satisfied, the exhaust gas recirculation system including: an exhaust gas recirculation passage that connects an intake passage and an exhaust passage of the internal combustion engine; and an exhaust gas recirculation valve that changes a cross section of the exhaust gas recirculation passage, the system comprising:
a storage device in which a correlation is stored in advance, which holds during a predetermined period of time immediately after the fuel cut control is stopped, between engine rotation speed and an index value indicating an amount of burned gas contained in recirculated exhaust gas that passes through the exhaust gas recirculation valve; and
a computing device that computes the index value from the correlation based on an engine rotation speed immediately after the fuel cut control is stopped.

6. The burned-gas passage amount computing system used in an exhaust gas recirculation system according to claim 5, wherein the computing device computes, as the index value, a value that shows a trend that the higher the engine rotation speed is, the higher a speed of increase in the amount of burned gas is.

7. The burned-gas passage amount computing system used in an exhaust gas recirculation system according to claim 5, wherein the index value indicates a ratio of burned gas contained in the recirculated exhaust gas that passes through the exhaust gas recirculation valve to the recirculated exhaust gas.

8. A burned-gas passage amount computing method used in an exhaust gas recirculation system of an internal combustion engine in which fuel cut control is performed in which fuel supply is temporarily stopped when a condition for performing the fuel cut control is satisfied, the exhaust gas recirculation system including: an exhaust gas recirculation passage that connects an intake passage and an exhaust passage of the internal combustion engine; and an exhaust gas recirculation valve that changes a cross section of the exhaust gas recirculation passage, the internal combustion engine has, in the exhaust passage, an air-fuel ratio sensor for detecting an air-fuel ratio based on a concentration of oxygen in exhaust gas, the method comprising:
providing an electronic control unit having an electronic storage device, the electronic control unit configured to:
determine a correlation, which holds during a predetermined period of time immediately after the fuel cut control is stopped, between engine rotation speed and an index value indicating an amount of burned gas contained in recirculated exhaust gas that passes through the exhaust gas recirculation valve, the index value indicates a ratio of burned gas contained in the recirculated exhaust gas that passes through the exhaust gas recirculation valve to the recirculated exhaust gas;
store the determined correlation in the electronic storage device in advance; and compute the index value from the correlation stored in the electronic storage device, based on an engine rotation speed immediately after the fuel cut control is stopped;

wherein the correlation is determined by setting, in advance, a model equation that represents a correlation, in which the ratio of the burned gas is an unknown and which holds immediately after the fuel cut control is stopped, between the air-fuel ratio detected by the air-fuel ratio sensor and an air-fuel ratio of a mixture in an engine combustion chamber, and determining, a plurality of times, variation of the ratio of the burned gas that satisfies the model equation, based on variation of the air-fuel ratio monitored with the use of the air-fuel ratio sensor while the engine rotation speed is varied.

9. The burned-gas passage amount computing method used in an exhaust gas recirculation system according to claim 8, wherein when the air-fuel ratio detected by the air-fuel ratio sensor is "AbyF", a transfer function of the air-fuel ratio AbyF with respect to variation in the air-fuel ratio of the mixture in the engine combustion chamber is "F(t)", the amount of recirculated exhaust gas that passes through the exhaust gas recirculation valve is "Klegr", a transfer function of the amount of recirculated exhaust gas that is taken into the engine combustion chamber with respect to variation in the amount Klegr is "G(t)", a transfer function of the ratio of the burned gas with respect to the variation in the air-fuel ratio of the mixture in the engine combustion chamber is "H(t)", an amount of fuel supplied to the engine combustion chamber is "Qr", and an amount of air taken into the engine combustion chamber, from which an amount of air taken into the engine combustion chamber through the exhaust gas recirculation passage has been subtracted, is "Klall", a following equation is set as the model equation:

$$AbyF=F([Klall+G\{(1.0-H(t))\times Klegr\}]/Qr).$$

10. The burned-gas passage amount computing method used in an exhaust gas recirculation system according to claim 9, further comprising, before determining the correlation, determining the transfer function F(t) from the model equation based on the air-fuel ratio detected by the air-fuel ratio sensor while the exhaust gas recirculation valve is closed.

* * * * *